Oct. 11, 1938.   R. P. FISHER   2,133,022
ROTARY DRILL BIT
Filed April 20, 1937
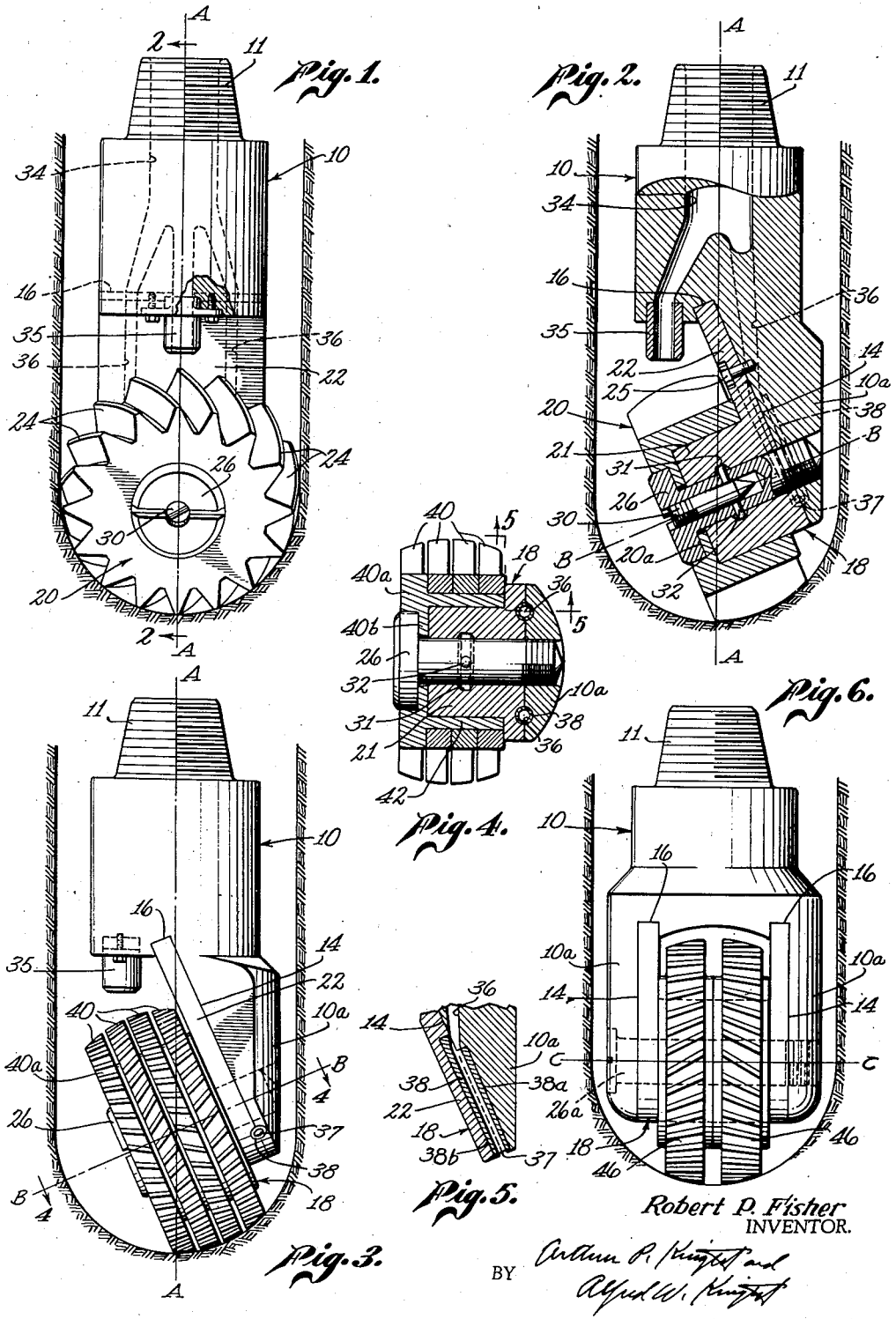
Robert P. Fisher
INVENTOR.
BY
ATTORNEYS Patented Oct. 11, 1938

2,133,022

UNITED STATES PATENT OFFICE 2,133,022

ROTARY DRILL BIT

Robert P. Fisher, Los Angeles, Calif., assignor of fifty-one percent to Rudolph Pageman, Los Angeles, Calif., and twenty-four percent to Pierce W. Koontz, Los Angeles, Calif.

Application April 20, 1937, Serial No. 137,937

8 Claims. (Cl. 255—71)

The present invention relates generally to earth boring tools of the type used in drilling oil wells and the like, and more particularly to rotary drill bits having cutters rotatably mounted upon a shank member.

A general object of my invention is to provide a rotary drill bit of simplified construction which offers safety, strength, long life, and easy replacement of all parts subjected to wear. Drilling tools are, in general, subjected to heavy loads and hard usage, requiring that the bit be of strong construction; and the problem of providing the necessary strength becomes particularly acute in designing bits of the smaller sizes that are used in deep well drilling. Simplified construction with elimination of parts permits each remaining part to be made larger, with a consequent increase in strength. Not only does the increase in strength insure a longer life of the tool and permit the driller to apply heavier loads and higher speeds during drilling operations, but the factor of safety is materially increased. Safety is a paramount item in drill bit construction, since breakage and loss of parts down in a deep well present serious and expensive problems of finishing or milling up the lost parts before drilling can proceed.

It is also a chief object of my invention to provide in a drill bit having a rotary cutter, a maximum amount of bearing surface for the cutter to rotate upon. The load, and consequently the amount of wear, are in general directly proportional to the amount of bearing area provided for the rotary cutter. It is obvious that with an increase in area the bearing will have a correspondingly longer life. This means that in formations where cutting teeth wear down slowly, the bearing is certain to last as long as a cutter can possibly be used; and in harder formations where teeth dull rapidly, an increased number of cutters can be run upon a single shank bearing, with attendant savings in time and expense.

Another object its to provide a bit in which replacement of the rotary cutters is easily accomplished without any special tools or equipment and may be done upon the drilling rig under field conditions while the shank is still on the drill collar. In many types of bits the cutters are secured in place by welding a portion of the shank, and in many others complicated locks requiring special tools or equipment are used. All such bits require that the entire tool be broken loose from the drill collar and at least taken off the rig, if not back to the shop, when a change of cutter is made. The time required for changing is so great that drilling operations cannot be suspended to await the return of the same bit, and it is customary to have another complete replacement tool available. A large investment in extra tools is eliminated, and time and labor saved when a worn cutter can be replaced at the rig by a new one without the necessity of even removing the shank from the drill collar.

Another principal object is to provide a drill bit in which both the cutter and the cutter bearing are detachable from the shank and the shank has no parts which become worn during drilling. A shank which has no worn parts will last more or less indefinitely compared with present tools and the investment in materials and labor to manufacture a shank has a greatly extended life. With this construction all wearing surfaces are concentrated upon the cutter and the bearing, both of which, being detachable, can be easily repaired, or, if too badly worn, can be discarded without the relatively great monetary loss incurred by junking an irreparably worn bearing formed as an integral portion of an otherwise usable shank.

It is an added object to provide a shank on which there is a minimum of machine work. This is the greatest single item of cost in manufacturing a shank, and reduction in this item enables quantity production with marked advantages and savings.

Another object of the invention is to provide a drill bit in which those portions of the fluid circulation passages subjected to the greatest amount of scour are provided with replaceable liners, so that the main portions of the bit need not be discarded simply because the sand in the circulation fluid has worn away the bit to such an extent that repair is not possible.

And it is a further object to provide a rotary drill bit having a rotatable cutter which may be made with any one of a number of different tooth formations that may be best suited to the formation being drilled, and which has a substantially rolling motion over the formation being cut. It is well known that rolling motion is best adapted to hard formations, and such a cutter may be easily adapted to softer formations by suitable changes in the tooth formation and design. A drill bit of this design is versatile and, by the simple expedient of changing the cutters, can be quickly and easily adapted to the wide range of formations which may be encountered while drilling a well.

I have attained these objects in a bit constructed according to my invention by providing a shank, a cutter bearing member detachably mounted upon the shank, and a cutter rotatably mounted on the bearing. The bearing is formed with a cylindrical portion and an extension disposed at right angles or substantially so to the axis of the cylindrical portion and adapted to bear against the shank in load-transmitting relation. Wearing surfaces are only on the bearing and the cutter, which are separable from the shank and are held in assembled position on the shank by a single member which prevents the bearing from dropping off the shank.

How the above and other objects and advantages of my invention are attained will be more readily understood from the following description and the annexed drawing, in which:

Fig. 1 is a front elevation of a bit constructed in accord with my invention;

Fig. 2 is a vertical median section on line 2—2 of Fig. 1;

Fig. 3 is a fragmentary side elevation of a variational form of bit, showing a cutter assembly with a number of annular cutters;

Fig. 4 is a section on line 4—4 of Fig. 3;

Fig. 5 is a fragmentary section on line 5—5 of Fig. 4; and

Fig. 6 is a fragmentary side elevation of a variational form of bit in which the cutters revolve about a horizontal axis.

The drill bit illustrated in Figs. 1 and 2 comprises a shank 10 having on its upper end a threaded pin 11 by which the bit is adapted for attachment to a drill stem, not shown. By means of the drill stem the bit is rotated about its longitudinal axis A—A which is normally generally vertical and under usual conditions will coincide with the axis of the hole being drilled through the earth formation. It will be understood that when in the following description directional terms such as "horizontal" or "vertical" are used, these terms are merely descriptive of the drill bit and are characteristic of the usual or normal position of the tool, but are not to be construed as limitative upon the invention since the longitudinal axis of the tool often may be inclined. The lower portion 10a of the shank is formed with a thrust surface 14 which, from a point centrally of the bit, is inclined downwardly and outwardly toward the circumference of the bit and is approximately at right angles to axis B—B. Thrust surface 14 is preferably a substantially plane surface, though it may be given other suitable configuration, and may be termed a downwardly disposed surface. At the upper end of thrust surface 14, shank 10 is provided with transverse slot 16, the upper end of which is formed by a surface also downwardly disposed. The drill bit is provided with a bearing member, generally indicated at 18, upon which is rotatably mounted cutter 20. Bearing member 18 may be considered as comprising two portions. One is the cylindrical portion 21 forming the bearing upon which cutter 20 is journaled to rotate about bearing axis B—B; and the other is the extension portion 22 formed integrally with cylindrical bearing 21, that extends axially and preferably also radially from bearing portion 21 to form means for attaching the bearing to the shank and for transmitting drilling loads to the bearing and cutter mounted thereon. Extension 22 preferably takes the plate-like form shown disposed substantially at right angles with respect to the axis B—B and has an upwardly disposed, substantially plane surface which is complementary to shank thrust surface 14 and adapted to bear against the shank surface in load-transmitting relation, as shown. The upper end of bearing extension 22 is of the proper size to slip snugly into slot 16 in the shank and bear against the side faces of the slot. Although as mentioned below, pin 26 holds bearing 18 from moving downwardly relative to the shank, a safety screw 25 is also provided as an added safeguard for the same purpose.

Cutter 20 is preferably more or less cylindrical in shape and has around its periphery a number of cutting teeth 24. It will be realized that the shape and design of the cutter and its teeth may be varied widely in order to best adapt the drill bit to the formation being drilled. In the forms shown in Figs. 1 and 2, the rotating cutter has an internal bearing surface in direct contact with the external bearing surface of bearing 21.

Any suitable means of fastening or holding the rotating cutter upon the bearing may be resorted to, but it is preferred to provide the cutter with a flange 20a which fits underneath the head of pin 26. Pin 26 passes through a central bore in the cutter and bearing 18 and is threaded at its other end so that it may be screwed into a tapped bore in the lower portion 10a of the shank. By means of this construction a single member performs the function not only of holding the cutter upon its bearing, but also of securing the bearing member 18 to shank 10 against any vertical movement of the bearing relative to the shank. As a matter of safety, in order to prevent pin 26 from unscrewing and thus permitting the parts to become loosened, there is provided locking pin 30 which moves longitudinally within an axial bore in pin 26. Lock pin 30 is in threaded engagement with pin 26, so that the lock pin is advanced or retracted by turning it. The pin bore through bearing 18 is formed with an annular recess 31, while pin 26 has one or more studs 32 that are slidably held in radial bores in pin 26 and, being longer than the radial thickness of pin 26 between its axial bore and its periphery, are radially movable with respect to the pin to enter recess 31. After pin 26 has been tightened, lock pin 30 is then screwed up and the tapered forward end of the lock pin contacts studs 32 to move them outwardly and into recess 31. The parts then assume the position shown in Fig. 2, in which engagement of the studs with bearing 18 prevents axial movement of pin 26 with relation to the bearing. To disassemble the parts, the lock pin is unscrewed and studs 32 withdrawn from recess 31 into pin 26 so that pin 26 can be removed. To facilitate retraction of studs 32, recess 31 has inclined or tapered side walls and the ends of studs 32 are rounded or tapered, so that axial movement of pin 26 moves studs 32 inwardly when lock pin 31 is not in place.

The shank is provided with a fluid passage 34 by means of which drilling fluid is received from the drill stem and discharged into the well space around the bit. One branch of the fluid passage discharges through nozzle 35 mounted on the shank by cap screws passing through integral wings on the nozzle. The stream of water from nozzle 35 strikes the teeth of cutter 20 and removes cuttings that adhere to the teeth so that they are always kept clean and in efficient condition to cut. The other branch or branches 36 (there are preferably two such) have a lower portion that lies partially in the shank and partially in bearing 18, and discharges at 37 (see Fig. 3) near the bottom of the hole. The fluid streams issuing from these two water passages flush the cuttings off the bottom so that the cutter is always working on uncut formation, and also stir up the cuttings so that they are carried up into the upwardly moving stream of fluid around the drill stem which carries the cuttings to the surface.

As best shown in Figs. 4 and 5, the lower portion of each water passage 36 is provided with a detachable liner 38 which may be replaced easily when it has become unduly worn by the scouring action of the solid particles carried by the circulation fluid. Liner 38 is held clamped between the shank and bearing 18 and is so formed as to hold it in this position against downward movement. For this purpose the liner is preferably tapered downwardly, that is, the lower end is of slightly smaller external diameter than the upper end and the shank and bearing 18 are provided with correspondingly tapered recess 38a and 38b, respectively, so that the liner will wedge in the space between the shank and bearing and will not be forced outwardly by the stream of fluid. By tapering the liner externally and also the corresponding surfaces of the shank and bearing, the liner is securely held in place without the use of pins, bolts, welding or other fastening means. Both liner 38 and nozzle 35 may be made of any suitable material, such as metal, but it is preferred that they be made of a non-metallic material such as molded rubber, since materials of this nature have been found to have superior resistance to scouring by sand carried in the fluid stream.

Axis B—B about which the cutter rotates, and longitudinal shank axis A—A intersect at or near the center of the cutter, that is, at the mid-point of the length of axis B—B lying between the sides of the cutter. The cutting edges of teeth 24 are arcuate in outline, as shown in Fig. 2, and conform to the surface of an imaginary sphere having its center at the intersection of axes A—A and B—B. Under some conditions it may be desirable to have the cutting edges of the teeth lie parallel to axis B—B, but in general it is preferred to incline them to the axis of rotation as shown on the cutter in Fig. 1.

The inclination of axis B—B from the horizontal can be varied to best suit drilling conditions and the type of cutter assembly used on the bit, but with the type of cutter illustrated in Figs. 1 and 2, it is preferred for best efficiency that the inclination be sufficient that the longitudinal axis of the shank pass through the lower corner of the cutter (see Fig. 2). This amount of inclination places the contact of the cutter at the bottom of the hole as seen in Fig. 2, wholly or substantially so at one side of the shank axis, with the result that the forces on the cutter tending to rotate it about its own axis by virtue of the cutter contact at the bottom of the hole are predominantly effective in the same direction upon the cutter. A lesser inclination decreases the magnitude of forces producing positive rotation of the cutter; while a greater inclination prevents teeth 24 from reaching the center of the hole, thus leaving a cone of uncut formation around which the bit revolves with an obvious lessening of efficiency.

A drill bit constructed as described produces a hole with a hemispherical bottom of the same radius as the sphere in which lie the cutting edges 24. Almost the entire lower half of the cutter is in engagement with the formation being drilled, and because this engagement is principally at one side of the longitudinal axis of the bit, the cutter rolls over the bottom of the hole. The longest diameters of the hole drilled and the cutter are equal and coincident, in a horizontal plane passing through the center of the cutter. As a result of this relation any tendency for movement of the bit toward the left as viewed in Fig. 2 is prevented, since substantially the entire lower half of the cutter is in engagement with the formation and will not permit the bit to move into a portion of the hole having a diameter smaller than the cutter itself; and so there is of course no necessity for providing on the shank a bearing portion that rides against the sides of the hole in order to keep the bit centered and in proper drilling position.

Under drilling conditions there are two loads applied to the cutter, the vertical load represented by that part of the weight of the drill stem used as drilling weight, and the torque for turning the bit in the hole. Both these loads are transmitted to the cutter from the shank by contact of bearing extension 22 with thrust surface 14 and the surfaces of slot 16. In order to transmit the vertical load, there must be a downwardly disposed surface on the shank, which surface may be in slot 16 or face 14, or both, and here the combination of two such faces on the shank transmits all loads to the cutter by contact with the bearing extension. Torque is transmitted by the contact on thrust face 14 and the parallel face of slot 16, and to provide a maximum of area it is preferred to make extension 22 as wide as the diameter of the shank. The tool is more stable and better transmission of loads secured if thrust face 14 and extension 22 extend upwardly to a point on or near the shank axis A—A, since then faces receiving vertical loads are above the principal part of the area of cutter engagement with the formation (see Fig. 3) and there is then no eccentric force tending to separate extension from contact with face 14. With such construction there is no load on either pin 26 or screw 25 when drilling. Pin 26 operates primarily to hold the cutter assembly and shank against relative horizontal movement while drilling, and when taking the bit out of the hole, the pin prevents the cutter and bearing from dropping down off the shank and becoming lost in the hole. Because there is no drilling load on pin 26, there is very little possibility that it will fail as a result of repeated shock or heavy loading, and there is little danger of leaving parts of the tool in the hole. Bearing 18 is amply strong enough to take all loads, and journal bearing 21 is large and strong, and offers such a large bearing surface that long life is assured. Replacement of the cutter or bearing is simply and easily accomplished with a wrench when on the drilling rig, and eliminates the complications and difficulties encountered when cutting and welding of members must be resorted to.

The cutter assembly used on the bit may comprise one or more individual cutters, and a variational form of bit embodying this latter type of construction is shown in Figs. 3 and 4. The construction of this new form is in general the same as that already described except for the cutter assembly and the bearing arrangement by which the cutter is rotatably mounted. In Figs. 3 and 4, the single cutter 20 of Fig. 1 has been replaced by a plurality of annular cutters 40, each provided with cutting teeth around its periphery. The outermost cutter 40a of this assembly has an integral bearing sleeve 42 rotatably mounted upon and in direct contact with cylindrical portion 21 of bearing 18. The remaining annular cutters, here three in number, are rotatably mounted on and in direct contact with bearing sleeve 42. Thus a portion of the cutters are journaled upon a bearing sleeve having both inner and outer bearing surfaces, which is in turn journaled upon the shank bearing.

The cutter assembly is mounted upon the shank in the same manner as before described, the outermost cutter having a flange 40b which fits under the head of pin 26. The inner annular cutters are held in place by a shoulder upon cutter 40a.

The cutting action of this variational form of bit is the same as that already described, except that the annular cutters will revolve in the same direction at different speeds depending upon the average distance from the vertical axis of the bit to their points of contact at the bottom of the hole. From Fig. 3 it will be seen that cutter 40a, being nearest the axis, will roll in a very small circle around the vertical axis A—A and consequently will turn most slowly around axis B—B. The remaining cutters roll in progressively larger circles and consequently at progressively increasing speeds. It will be noticed that the bearing sleeve revolves in the same direction on bearing 21 as the remaining cutters mounted upon the bearing sleeve which tend to move it with them. Consequently the amount of wear on the sleeve caused by the cutters 40 is reduced and the total wear of the bearing assembly is distributed between the inner and outer faces of the bearing sleeve. Sleeve 42 is made a part of cutter 40a because with this construction the forces exerted assure the constant rotation of the cutter which, because of its short distance from axis A—A, has the least tendency to rotate. The sleeve also offers the advantage of being quickly and easily replaceable to take up the slack in a worn bearing, and of providing the maximum bearing surface for cutters 40, since the sleeve is of large diameter, so that wear on the bearing is kept to a minimum.

This construction may be varied by providing a sleeve which is not integral with an annular cutter, and this arrangement may be most easily derived from that shown by omitting the cutting teeth on annular cutter 40a. Such a sleeve if free will rotate upon cylindrical bearing 21, since the friction of the annular cutters mounted upon it will tend to revolve it in the same direction; or it may be fixed relative to the shank bearing so that it provides the only bearing surface for the annular cutters and takes up all the wear produced by their rotation.

Fig. 6 illustrates another variational form of my invention in which rotational axis C—C of the cutters is made horizontal. The shank is adapted to carry two bearing members 18 upon which the cutters 46 are rotatably mounted. Shank 10 is provided with two lower portions 10a, each having a thrust surface 14 at the top of which is a slot 16, the top of which is a downwardly disposed thrust-receiving surface. Each bearing member 18 bears against one of faces 14 and at the center against the other bearing and is received at its upper end in a slot 16, in thrust-receiving relation to the shank surfaces. One or more rotatable cutters are mounted upon bearings 18, each cutter being so arranged that it contacts the formation at the bottom of the hole entirely or substantially so at one side of the vertical axis of the shank when viewed in the aspect of Fig. 6. A single pin 26a passes through both bearings and not only holds the cutters mounted upon the bearings but also holds the bearings against movement relative to the shank. As will be well understood by those skilled in the art, the two cutters 46 may be mounted to rotate about a single axis or they may be made to rotate about individual axes horizontally offset with respect to each other. In the former case, the diameter of the cutters is substantially the same as the diameter of the hole produced, while in the second case the diameter of the cutters is somewhat less, depending upon the amount of offset of the axes.

In addition to the foregoing embodiments, it will be understood that changes in construction, form, and arrangement of parts may be made in various forms of the invention I have described without departing from the spirit and scope thereof, so that the above description is to be construed as illustrative of, rather than limitative upon, the appended claims.

I claim:

1. In a rotary drill bit, the combination of a shank adapted for attachment to a drill stem for rotation thereby and having a substantially plane downwardly disposed thrust surface; a cutter-bearing member having a portion adapted to bear against the shank thrust surface in load-transmitting relation; means preventing movement of the bearing member relative to the shank; and a cutter rotatably mounted on the bearing member to turn about an inclined axis, said cutter being generally cylindrical and having cutting teeth around its periphery, the cutting edges of the teeth being inclined to the axis of cutter rotation and being arcuate to conform to a spherical surface having its center on the axis of cutter rotation.

2. In a rotary drill bit, the combination of a shank adapted for attachment to a drill stem for rotation thereby and having a substantially plane downwardly inclined thrust surface; a cutter-bearing member having a portion adapted to bear against the shank thrust surface in load-transmitting relation; means preventing movement of the bearing member relative to the shank; and a plurality of annular cutters rotatably mounted upon the bearing member to rotate about a common inclined axis, each of the cutters having teeth around its periphery.

3. In a rotary drill bit, the combination of a shank adapted for attachment to a drill stem for rotation thereby and having a substantially plane thrust surface inclined downwardly and outwardly; a cutter-bearing member having a portion adapted to bear against the shank thrust surface in load-transmitting relation; means preventing movement of the bearing member relative to the shank; a cutter rotatably mounted on the bearing member; and a single member for both holding the cutter on the bearing and securing the bearing to the shank.

4. In a rotary drill bit, the combination of a shank adapted for attachment to a drill stem for rotation thereby about a generally vertical axis; a bearing on said shank having an inclined axis; and a cutter assembly comprising one or more individual roller cutters rotatably mounted on the bearing to turn about said inclined axis, the cutting edges of the cutter assembly lying in a spherical surface having its center at the intersection of the vertical shank axis and the inclined bearing axis; and the inclination of the bearing axis being sufficient that the cutter assembly contacts the bottom of the drilled hole substantially entirely at one side of said vertical axis.

5. In a rotary drill bit, the combination of a shank adapted for attachment to a drill stem for rotation thereby about a generally vertical axis; a bearing on said shank having an inclined axis; and a cutter assembly comprising one or more individual roller cutters rotatably mounted on the bearing to turn about said inclined axis, said vertical axis intersecting the inclined axis mid-way of the axial dimension of the cutter assembly; and the inclination of the bearing axis being sufficient that the cutter assembly contacts the formation being drilled principally at one side of the vertical axis.

6. In a rotary drill bit, the combination of a shank; a bearing detachably mounted on the shank; a cutter rotatably mounted on the bearing; and locking means for holding the cutter, bearing, and shank together, said locking means comprising a pin passing through bores in the cutter and bearing and secured in an opening in the shank, a second pin axially movable within the first pin, an annular recess inside the pin bore in the bearing, and a stud carried in a radial bore in the first pin and movable by the second pin into the annular recess to prevent axial movement of the first pin.

7. In a rotary drill bit, the combination of a shank adapted for attachment to a drill stem for rotation thereby and having a downwardly disposed thrust surface; a cutter-bearing member having an extension adapted to bear against the shank thrust surface in load-transmitting relation; means preventing movement of the bearing member relative to the shank; a water passage in the bit having an upper portion in the shank and a lower portion partially in the shank and partially in the bearing extension; a replaceable liner within the lower portion of the water passage between the shank and bearing extension; and a cutter rotatably mounted on the bearing member.

8. In a rotary drill bit, the combination of a shank adapted for attachment to a drill stem for rotation thereby and having a downwardly disposed thrust surface; a cutter-bearing member having an extension adapted to bear against the shank thrust surface in load-transmitting relation; means preventing movement of the bearing member relative to the shank; a water passage in the bit having an upper portion in the shank and a lower portion partially in the shank and partially in the bearing extension; an exteriorly tapered replaceable liner of nonmetallic material within the lower portion of the water passage held clamped between the shank and bearing extension; and a cutter rotatably mounted on the bearing member.

ROBERT P. FISHER.